United States Patent Office 3,233,962
Patented Feb. 8, 1966

3,233,962
METHOD OF TREATING CELLULOSE FIBERS AND COMPOSITION RESULTING THEREFROM
George R. Nelson, Framingham, Mass., assignor to Dennison Manufacturing Company, a corporation of Nevada
No Drawing. Filed June 20, 1961, Ser. No. 118,273
10 Claims. (Cl. 8—116.2)

This invention relates to sheets of fibers such as paper and fabrics, and more particularly to methods for simultaneously sizing and increasing the wet strength of cellulose sheets and compositions resulting therefrom.

Sizing refers to those treatments of paper which increase resistance to the penetration of water, while wet strength refers to the strength of the paper when wetted with water. Heretofore paper has been independently treated to improve it with respect to each characteristic. Sizing has been accomplished by impregnating the paper with a rosin soap precipitated with alum in situ to form an insoluble metal rosinate, impregnation with rubber latices, or treatment with metal complexes of fluorinated organic acids. Wet strengthening of paper has generally been accomplished by treating with formaldehyde adducts of urea, melamine or phenol. In addition to the two independent steps involved, the prior wet strengthening materials have undesirably stiffened the sheet.

It is the principal object of the present invention to provide improved paper and other cellulosic sheets by means of a treatment which simultaneously improves both of the above characteristics without unduly stiffening the sheet.

It has now been found that fibrous sheet of cellulose such as paper or the like may be simultaneously sized and wet-strengthened by first impregnating the fibers with a polyamide resin followed by impregnation with a polyisocyanate. For reasons set forth below, it is believed that reaction occurs to chemically bond the impregnating material to the cellulose fibers providing a new composition of matter. The polyamides are the reaction products of polymerized polyene fat acids, or reactive esters or acyl derivatives thereof, with polyamines. The polymerized polyene fat acids can be saturated or unsaturated. Resins are preferred which are the reaction product of dilinoleic acid and polyamines. Polyamide resins of this type are well known and are disclosed for example in the U.S. Patents 2,450,940 and 2,379,413 and are marketed, for example, by the General Mills Corp. under the trademark Versamides. The polyamide resins useful herein must have an amine number or value, as defined in the U.S. Patent 2,867,592 and in terms of milligrams of potassium hydroxide equivalent to the amine alkalinity present in one gram of sample, of at least 3. The average molecular weights of commercially available polyamides of this type are between about 3,000 and 10,000.

Substantially any polyisocyanate, that is any compound having two or more isocyanate groups (NCO), can be used. Examples include toluene 2,4 diisocyanate; toluene 2,6 diisocyanate; methylene bis (4-phenyl isocyanate); 2,4,4' triisocyanato diphenyl oxide in toluene diisocyanate (Hylene DP-2 of DuPont); the phenol adduct of the reaction product of a polyol with a diisocyanate (Mondur S of the Mobay Chemical Company); and mixtures thereof.

The impregnation amount of the polyamide resin and polyisocyanate are not critical within reasonably broad limits. Small amounts give some improvements in the properties of the cellulose sheet while increasing amounts beyond an optimum value unduly increase the expense and undesirably rigidify the sheet. Generally it has been found that the polyamide resin can usefully be employed in a weight amount between about 0.2% to about 100% of the weight of the untreated sheet, while the polyisocyanate can be added in a weight amount between about ⅓ and ten times the weight of the polyamide resin addition. From 2 to 4 percent polyamide, based on the weight of the untreated sheet, is preferred, together with an equal amount of polyisocyanate compound. If desired, the sheet can be treated with polyamide resin and stored for later treatment with polyisocyanate. However, reaction with the polyisocyanate is necessary to impart water and organic solvent resistance and to enhance the heat resistance of the resulting sheet.

Polyamide amines number or value of at least three is necessary since the amine value measures the reactivity of the resin with the polyisocyanate. Increasing amine values increase the reactivity but reduce the flexibility of the resulting sheet. Useful products have been made with amine value as high as 450 which is the highest known value of any currently available polyamide resin.

The invention may be better understood by reference to the following examples, the treated sheet of Examples 1–13 being conditioned at 73° F. for 16 to 24 hours at 50% relative humidity and tested with the results reported in Table I below.

EXAMPLE 1

A 30-pound sulphate paper sheet was impregnated with a 2% by weight isopropanol solution of a polyamide resin of the above type having an amine number of 83, and the sheet dried. The dried polyamide resin addition to the sheet was equal to 2% of the dry weight of the untreated paper. The treated sheet was then impregnated with a 2% toluol solution of methylene bis (4-phenol isocyanate) and dried at 100° C. to remove the solvent. The addition of isocyanate was equal to 2% of the dried weight of the untreated paper.

EXAMPLE 2

The materials and procedure was the same as in Example 1 except that the addition of polyamide was equal to 22% and the isocyanate addition equal to 6.5%, based on the dry weight of the untreated paper.

EXAMPLE 3

A 30-pound sulphate sheet was impregnated with a 15% toluol solution of a polyamide resin having an amine number of 400, the polyamide addition being 10%. The sheet was then treated with a 15% toluol solution of methylene bis (4-phenyl isocyanate) and dried.

EXAMPLE 4

A 30-pound sulphate sheet was treated with an isopropanol-water solution of a polyamide having an amine number of 400, the addition being 11%, and then treated with a toluene solution of 2,4 toluene isocyanate to obtain a total weight addition of 13% and dried.

EXAMPLE 5

An unbleached, 3 mil, sulphate kraft sheet was impregnated with a 15% solution in isopropanol of a polyamide resin having an amine number of 88, and dried. The resin addition was 9%, the drying being conducted for one minute at 212° F. to remove the solvent. The dried sheet was then treated with a 15% toluene solution of methylene bis (4-phenol isocyanate) and dried at 100° C. for one minute to remove excess toluene and isocyanate compounds.

EXAMPLE 6

The same kraft sheet as in the preceding example was impregnated with 15% toluol solution of a polyamide resin having an amine number of 400 and dried with an addition of 9% polyamide resin. The dried sheet was then treated with a 15% toluene solution of methylene bis (4-phenol isocyanate) and the excess toluene and isocyanate removed by drying at 100° C. for one minute.

wet Mullen tests were performed after soaking the sheets for 16 hours in water at 72° F.

Table 1

| Example | Dry Tensile | Wet Tensile | Dry Tear | Wet Tear | Dry Mullen | Wet Mullen | Rigidity | Densometer | Penetration to H₂O |
|---|---|---|---|---|---|---|---|---|---|
| Control | 32.6 | 0.25 | 56 | 7.3 | 33 | 0.5 | 73.3 | 44 Sec | 10 Sec. |
| 1 | 36.4 | 14.2 | 60 | 116 | 43.2 | 12.7 | 81.3 | 54 Sec | >5 Hrs. |
| 2 | 38.3 | 8.1 | 48 | 132 | 50.2 | 7.5 | 91 | >30 Min | >5 Hrs. |
| 3 | 33.7 | 5.9 | 57 | 85 | 57 | 5.3 | 84.4 | | |
| 4 | 33 | 18.5 | 51 | 85 | 46 | 31 | 160 | | |
| 5 | | 12.5 | | 155 | | | | | |
| 6 | | 5.9 | | 85 | | | | | |
| 7 | | 6.7 | | 100 | | | | | |
| 8 | | 4.8 | | 64 | | | | | |
| 9 | | 4.5 | | 70 | | | | | 3 Hrs. |
| 10 | | 16 | | 115 | | | | | |
| 11 | | | | | | | | | |
| 12 | | 5.1 | | 68 | | | | | |
| 13 | | 6.0 | | 70 | | | | | |

EXAMPLE 7

The same as the preceding example excepting that the polyamide treated sheet was thereafter treated with a 15% toluene solution of 2,4,4' triisocyanato diphenyl oxide in toluene and the solvent and excess isocyanate removed by drying.

EXAMPLE 8

The same as in the preceding example excepting that the polyamide treated sheet was thereafter treated with a 15% toluene solution of a phenol blocked polyisocyanate (Mondur S of the Mobay Chemical Company) and the sheet dried.

EXAMPLE 9

A 3 mil, unbleached sulfate kraft sheet was impregnated with an 0.2% of Versamide 140 (a polyamide resin of the General Mills Company) and dried with an amide addition by weight of 0.2%. The dried sheet was then treated with an 0.2% toluene solution of an 80–20 mixture of toluene 2,4 diisocyanate and toluene 2,6 diisocyanate and dried.

EXAMPLE 10

The same kraft sheet as in the preceding example but treated with a 10% water solution of Versamide 140 and dried with a resin addition of 10%. The sheet was then treated with a 10% toluene solution of an 80–20 mixture of 2,4 and 2,6 toluene diisocyanates and dried to remove the toluene and unreacted isocyanate.

EXAMPLE 11

An unbleached kraft pulp was beaten in a laboratory beater with 4% Versamide 140 based on the dry weight of the pulp, for one hour. The pulp was then processed conventionally to make a 30-lb. unbleached kraft paper sheet. The sheet was then treated with a toluene solution of Hylene TM of DuPont and dried to provide a sheet with excellent size and wet strength characteristics.

EXAMPLE 12

A 3 mil, 30-lb. unbleached sulphate kraft sheet was impregnated with a 4% toluene solution of a polyamide resin having an amine number of 3 and dried at 150° C. for 30 seconds. The sheet was then impregnated with a 4% toluene solution of toluene 2,4 diisocyanate and dried at 150° C. for one minute.

EXAMPLE 13

A 3 mil, 30-lb. unbleached sulphate kraft sheet was impregnated with a 4% water-alcohol solution of a polyamide resin having an amine number of 450 (Genamide 250 of the General Mills Corp.). The sheet was then dried and impregnated with a 4% toluene solution of toluene 2,4 diisocyanate and dried.

Examples prepared as above indicated have the properties shown below in Table 1. The CONTROL represents the values for the same tests as performed on an untreated paper sheet. The wet tensile strength, tear strength, and wet Mullen tests were performed after soaking the sheets for 16 hours in water at 72° F.

Water resistance to penetration was measured as follows. A dry water-soluble acid dye was brushed onto a glass plate and a 3" by 3" test square of paper placed thereover. Several drops of water were then applied to the exposed paper surface and a glass tumbler placed over the water droplets. The time required for the water to strike through the paper and visibly solubilize the dye was taken as the penetration time.

Paper was also prepared as set forth below and comparison tests conducted on paper with no resin treatment, treated with the polyamide resin only, and paper treated with the polyamide followed by treatment with the polyisocyanate. These tests show that the treatment with the polyamide resin is of little benefit without the further reaction with isocyanate. Tests were also conducted to show the substantial resistance of the fully treated paper to heat degradation which renders the product suitable for electrical applications.

EXAMPLE 14

1,000 pounds of kraft pulp was beaten for 20 minutes with 40 pounds of a polyamide resin having an amine number of 400, in a water slurry of 3½% pulp consistency. After beating, paper was prepared on a Fourdrinier paper machine. The paper weighted 56.2 pounds, 24 x 36—500 and was 2.8% resin representing a resin retention of 70%. The paper was then treated with 2,4 toluene diisocyanate to a nitrogen content of 0.5% N, 1.3% by weight isocyanate being added to the sheet.

Samples of the above paper, together with samples of a similar kraft paper with no resin treatment and samples of the polyamide treated paper above prior to isocyanate treatment, were conditioned at 50% relative humidity at 73° F. for 3 days and tested with the following results:

Table 2

| Test | Untreated Kraft | Polyamide treated Kraft | Polyamide-Isocyanate Treated Kraft |
|---|---|---|---|
| Dry Tensile | 57 lbs. | 46 | 59 |
| Wet Tensile (24 Hr. Immersion) | 0.5 | 3.0 | 20 |
| Dry Tear | 125 | 124 | 125 |
| Wet Tear | 47 | 47 | 196 |
| MIT Fold: | | | |
| Dry | 1,760 | 1,100 | 1,300 |
| Wet | 0 | 0 | 945 |
| Rigidity | 498 | 356 | 427 |
| Heat Aging (150° C.) percent Retention: | | | |
| Tensile | 5.5 | 6.0 | 48.3 |
| Tear | 3.5 | 5.0 | 46.0 |
| Densometer | 50 | 60 | 60 |
| H₂O Penetration | <1 Sec. | <1 Sec. | >24 Hrs. |
| Weight (24 x 36–500) | 58 | 56 | 58 |

In the heat aging test, tensile and tear strengths were measured after one week of immersion in mineral oil at 150° C.

In Tables I and II above, tensile is reported in lbs./inch width machine direction (M.D.) as determined on a Scott J-2 Tensile Tester according to TAPPI Test 404m–50. Tear is reported in grams force necessary to tear 16 thicknesses of paper 2½" wide (M.D.), the tests being made on an Elmendorf tear tester according to TAPPI 414m–49. Mullen is reported in lbs./in.$^2$ according to TAPPI 403m–53, densometer was performed according to TAPPI 460m–49 for air resistance, and rigidity is reported in grams as determined on a Gurley Stiffness Tester.

It should be noted from the above examples that the polyamide impregnation can be applied to the cellulose fibers either before or after sheet formation. However, since a reaction occurs between the polyamide-treated cellulose, and polyisocyanate as indicated below, the isocyanate treatment should not be applied until after the sheet is formed and impregnated with polyamide.

It is believed that the following tests support the conclusion that the reaction product between the polyamide and the polyisocyanate is chemically bound to the cellulose. The treated sheet of Example 11 above was extracted with hot isopropanol for 8 hours and the following measurements made:

*Table 3*

| | |
|---|---|
| Paper weight before extraction _____g__ | 5.6233 |
| Paper weight after extraction _____g__ | 5.6097 |
| Loss in weight _____g__ | .0136 |
| Percent loss _____ | 0.24 |
| Percent total material added to sheet _____ | 2.85 |
| Paper pH before extraction _____ | 8.35 |
| Paper pH after extraction _____ | 8.40 |
| $N_2$ content of paper before extraction __percent__ | 0.34 |
| $N_2$ content of paper after extraction ____do____ | 0.33 |

These tests indicate that the polyamide resin, soluble in isopropanol, loses its solubility after reaction to the polyisocyanate.

The treated sheet of Example 11 above was shaken at 75° F. in cupraammonium hydroxide for 24 hours, the cupraammonium hydroxide solution being a solvent for cellulose. The results are as follows:

Untreated paper _____ Completely soluble.
Treated paper _____ Insoluble fibrous gel.

Wet tensile tests were also conducted upon the treated paper using an enzyme which attacks cellulose. Similar tests were conducted on the untreated control sheets both before and after exposure to the enzyme with the following results:

| | Control, lbs. | Treated Sheet, lbs. |
|---|---|---|
| Untreated with Enzyme | 2.2 | 10.9 |
| Treated with Enzyme | 0.75 | 10.5 |

The reactions which occur between the isocyanate and polyamide resins are believed to involve the isocyanate groups and the amine groups and amide groups of the resin. With the amide linkages, it is believed that acyl-urea is formed while with the amine group, a urea or amide linkage is formed.

While for foregoing examples illustrate the usefulness of the invention with regard to paper, similar reactions occur with other cellulosic material such as fabrics to provide similar improvements. The process is also useful to some extent with fibrous sheets other than cellulose.

It should be understood that the foregoing description is for the purpose of illustration only and that the invention includes all modifications falling within the scope of the appended claims.

I claim:

1. A sized sheet of flexible paper having enhanced wet strength comprising a sheet of cellulosic fibers coated with the reaction product of at least one polyamide resin which is the condensation product of at least one polymeric polyene fat acid and at least one polyamine, said polyamide resin having an amine number of at least 3, and a polyisocyanate reactive with said resin, said coated paper having dry strength and flexibility properties substantially as great as uncoated paper.

2. A fibrous sheet according to claim 1 wherein said polyamide is present in an amount not greater than the weight of cellulose present, said polyisocyanate being present in an amount between about ⅓ and 10 times the weight amount of said polyamide.

3. A sized sheet of flexible paper according to claim 1, wherein each of said polyamide resin and polyisocyanate are present in an amount equal to about 2 to 4% of the weight of the untreated sheet.

4. The method of making paper with water resistance and wet strength which comprises treating cellulosic fibers with a polyamide resin which is the reaction product of at least one polymeric polyene fat acid and at least one polyamine, said resin having an amine number of at least three, and thereafter treating paper comprising said fibers with a polyisocyanate reactive with said polyamide resin.

5. The method according to claim 4 wherein said polyisocyanate is a diisocyanate.

6. The method according to claim 4 wherein said polyamide resin is added in an amount between about 0.2 and 100% of the weight of said cellulosic fibers and said polyisocyanate is added in an amount equal to from ⅓ to 10 times the amount of the polyamide resin.

7. The method according to claim 4, wherein said polyamide and said polyisocyanate are added in approximately equal weight amounts, said polyamide being added in an amount equal to about 2 to 4% of the weight of said cellulosic fibers.

8. The method according to claim 6 wherein said polyamide resin has an amine number between 3 and about 450.

9. The method of making paper with water resistance and wet strength which comprises treating an aqueous slurry of papermaking cellulosic fibers with a polyamide resin which is the reaction product of at least one polymeric polyene fat acid and at least one polyamine, said resin having an amine number of at least 3, forming said paper, and thereafter treating the paper with a polyisocyanate reactive with said polyamide resin.

10. The method according to claim 9 wherein said cellulosic fibers are treated with polyamide resin in an amount not greater than the weight of cellulose present, and with said polyisocyanate in an amount between about one-third and ten times the weight amount of said polyamide.

References Cited by the Examiner
UNITED STATES PATENTS

| 2,303,364 | 12/1942 | Schirm | 8—116.2 |
| 2,333,914 | 11/1943 | Berchet | |
| 2,374,136 | 4/1945 | Rothrock | 8—116.2 |
| 2,710,816 | 6/1955 | Evans | 117—141 |
| 3,084,092 | 4/1963 | Arlt | 162—158 |

FOREIGN PATENTS

| 149,423 | 12/1952 | Australia. |
| 579,340 | 7/1946 | Great Britain. |
| 696,029 | 8/1953 | Great Britain. |
| 153,663 | 10/1953 | Great Britain. |

NORMAN G. TORCHIN, *Primary Examiner.*

JULIAN S. LEVITT, *Examiner.*